A. P. ANDERSON.
ART OF MAKING STARCH PEBBLES.
APPLICATION FILED OCT. 14, 1907.
1,035,833.
Patented Aug. 20, 1912.
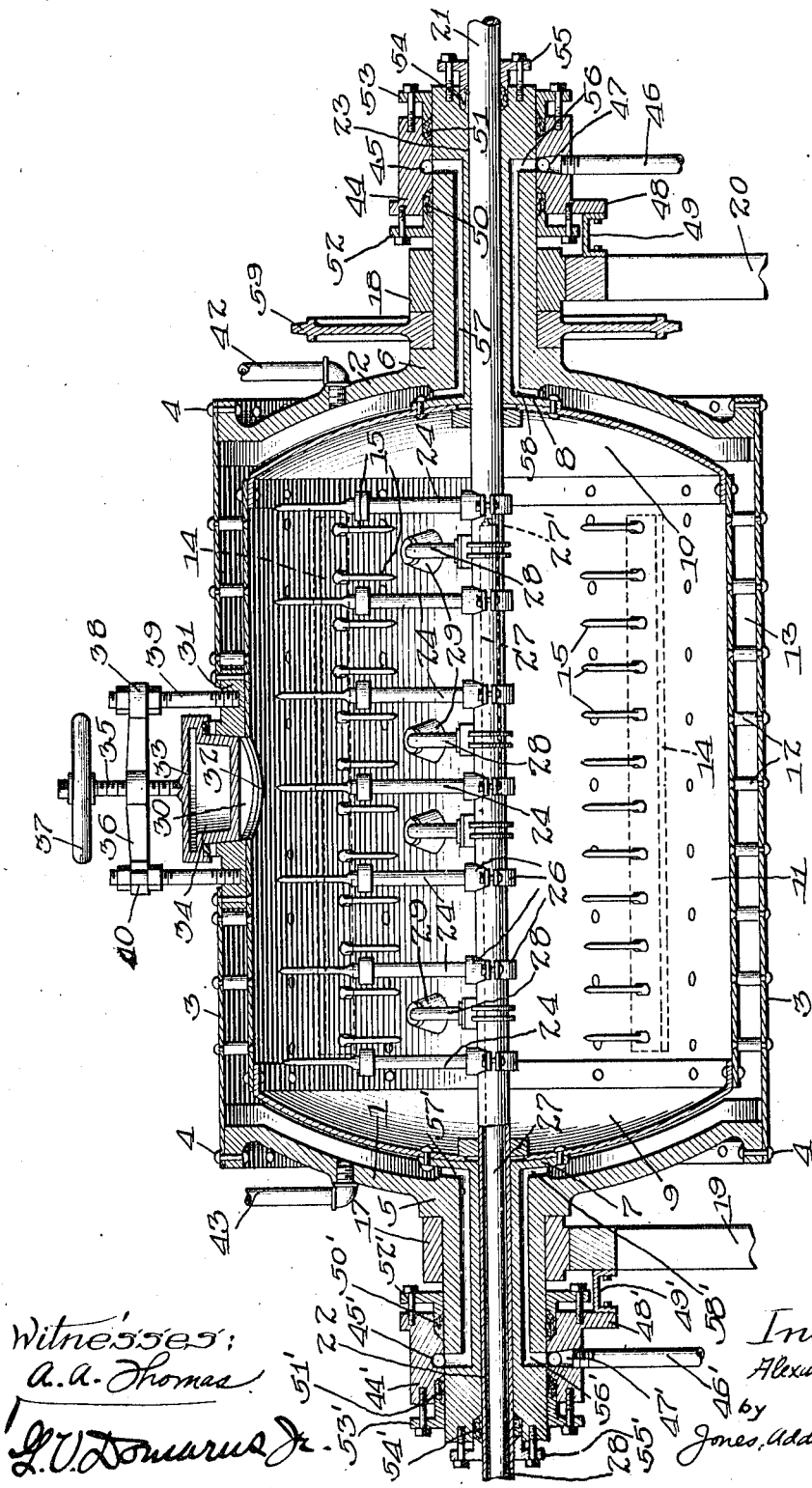

UNITED STATES PATENT OFFICE.

ALEXANDER P. ANDERSON, OF CHICAGO, ILLINOIS.

ART OF MAKING STARCH PEBBLES.

1,035,833.   Specification of Letters Patent.   Patented Aug. 20, 1912.

Application filed October 14, 1907. Serial No. 397,325.

*To all whom it may concern:*

Be it known that I, ALEXANDER P. ANDERSON, a citizen of the United States, residing at Chicago, in the county of Cook and State of Illinois, have invented new and useful Improvements in the Art of Making Starch Pebbles, of which the following is a full, clear, concise, and exact description, reference being had to the accompanying drawing, forming a part of this specification.

My invention relates to an improvement in the art of treating and drying starches of all kinds and has for its object a method of producing what I term pebbled-starch,—that is, starch in lumps of nodular or pebble-like form.

Broadly considered, my process consists in subjecting wet or green starch to the joint action of heat and pressure below that of atmospheric to dry the starch down to the desired degree of moisture, and then heating the starch under pressure above atmospheric until all of the starch has been formed into nodular or pebble-like lumps having the characteristics of the product claimed and described in my co-pending application Serial No. 332,804, filed August 31, 1906.

A preferred form of apparatus for carrying out the above process is fully disclosed in my co-pending application Serial No. 397,324, filed Oct. 14, 1907.

In the drawing accompanying this specification is illustrated a longitudinal sectional view of a suitable form of cooker, showing the interior construction of the same, as well as the connections for passing a heating or cooling fluid through the cooker-jacket.

The drum or cylinder (conveniently termed the "cooker") comprises a pair of end heads 1 and 2, preferably of heavy cast metal, to which is secured the outer cylindrical section 3 by means of rivets 4. The section 3 and the end heads 1 and 2 constitute the outer shell. The end head 1 is provided with a hub 5, while the end head 2 is provided with a similar hub 6. The inner ends of these hubs have peripheral flanges or shoulders 7 and 8, to which are riveted the end members 9 and 10, respectively. To these end members is secured the inner cylindrical section 11 spaced from the outer
section by stay-bolts 12. The section 11 and its end members 9 and 10 constitute the inner shell. There is thus formed a space or jacket 13 which surrounds the inner shell of the cooker. The inner shell has attached thereto upon its outer surface a series of ribs or strips 14 to which are secured the cutter or stirrer-pipes 15 to communicate with the jacket. It will be noticed that the free ends of these pipes are closed, so that any heating or cooling fluid admitted into the jacket will enter said pipes without passing therethrough. These pipes may be flattened in a plane transverse to the longitudinal axis of the cooker for the purpose of cutting or breaking large lumps of the material that may be rolled against said flattened edges during the rotation of the cooker. Of course, the configuration of these pipes may be varied at will; ordinary round pipes may be used, in which case they might do little or no cutting, but they would stir the material during rotation of the cooker just as effectively as the flattened pipes. The number of these pipes in a row, as well as the number of rows, is purely a matter of choice.

The cooker is rotatably supported by the hubs 5 and 6 in suitable bearing-blocks 17 and 18 mounted on standards 19 and 20. Passing longitudinally through the cooker is a stationary central pipe 21 which rests snugly in bores 22 and 23 in the hubs 5 and 6, without interfering with the free rotation of the hubs. To the central pipe 21 within the cooker is attached a series of pipes 24 which I call the breaker-pipes. These breaker-pipes are, like the stirrer-pipes 15, closed at their free ends and may be of any suitable construction,—such as cylindrical throughout their entire length.
Suitable clamps 26 may be employed for rigidly securing the breaker-pipes to the central pipe, into the upper parts of which clamps the pipes are screwed to communicate with the interior of the central pipe.
In this way any heating or cooling fluid admitted into the said central pipe will enter the breaker-pipes without passing therethrough. A second pipe 27 is concentrically arranged within the central pipe 21, being fastened thereto so as to rotate therewith, and is sufficiently smaller in diameter to leave a space 28 between the pipes. Communicating with the interior of the pipe 27 are the exhaust pipes 28, rigidly secured in position on the central pipe 21 in any preferred way. These exhaust pipes are open at their outer ends to establish connection between the interior of the cooker and the interior of the pipe 27. The inner end of the pipe 27 is closed beyond the last exhaust-pipe, as indicated at 27', while the other end is adapted to be connected to a vacuum and condensing pump, whereby the interior of the cooker may be exhausted to the desired degree of vacuum. It will be noticed that the pipes 28 are set back at an angle relative to the breaker-pipes 24. The object of this angular displacement of the pipes 24 and 28 on the central pipe 21 is to keep the free ends of the pipes 28 clear of the material under treatment when the breaker pipes 24 are turned down into the material in a direction toward the observer, for breaking up any masses that are too large to pass between the pipes 15 and 24. When the breaker-pipes 24 are thus turned down into the material, the pipes 28 will remain clear of the same, and will not, therefore, be in danger of having the openings in their free ends clogged. As a further prevention of such clogging it may be desirable to provide the free ends of these pipes with hoods 29.

Access to the interior of the cooker is afforded through an opening or man-hole 30 in the casting 31, said man-hole being in alinement with the opening 32 in the inner shell. An effective way of securing the casting to the cooker is to rivet or bolt the same to the shells in the space or jacket therebetween. In the instance shown the lid 33 is hollow as indicated at 34,—that is to say, it is provided with a passage whereby a suitable heating or cooling fluid may be admitted into the lid for the purpose of heating or cooling the same (as the case may be). The lid is pivotally mounted on the cooker and is held in closed or sealed position by a central member 35 adjustably carried (as, by screw-threading) in the cross-bar 36. A hand-wheel 37 permits ready adjustment of the member 35 either for moving it toward the lid to seal the same, or for raising it out of engagement with the lid to permit opening of the same. The cross-bar 36 is pivoted at one end 38 to the upright member 39 screwed into the casting 31. The other end 40 of the cross-bar 36 is slotted to engage the upright member 41 likewise screwed into the casting.

When it is desired to open the lid it is only necessary to raise the central member 37 out of engagement with the lid, whereupon the cross-bar 36 may be swung aside on its pivot out of the path of the lid. By connecting the pipes 42 and 43 (which communicate with opposite sides of the jacket) with the passage in the lid, some of the heating or cooling fluid may be by-passed around the jacket through the lid.

I shall now describe the connections whereby any suitable heating or cooling fluid may be passed through the jacket. The stuffing-box 44 is provided with a circular groove 45, forming what might be termed a steam-space. To the lower portion of the stuffing-box is secured a pipe 46, adapted to be connected with a source of fluid-supply, such as steam. The radial opening 47, into which this pipe is secured in the stuffing-box, communicates with said steam-space. Although the pipe 46 and its connections might be sufficient to prevent rotation of the stuffing-box, I positively forestall any such possible rotation by connecting the flange 48 on the stuffing-box with the standard 20 by means of a brace or bracket 49. The packings 50 and 51 are held in place by the glands 52 and 53, respectively, secured to the stuffing-box. The packing 54 at the extreme end of the hub 6 is held in place by the gland 55 secured to the hub. The radial passages 56 in the hub are in alinement with the space 45 so as to communicate therewith. At their inner ends these radial passages communicate with the longitudinal openings 57 in the hub. These longitudinal openings in turn connect with the radial passages 58 formed in that portion of the end head 2 which projects into the jacket.

The above described arrangement at the right of the figure for the admission of a suitable heating or cooling fluid through the hub 6 into the jacket 13, is substantially duplicated at the left of the figure to permit the exit of the heating or cooling fluid from the jacket through the hub 5. For this reason I deem it quite unnecessary and superfluous to reiterate in detail the said arrangement at the left of the figure, whereby the heating or cooling fluid is allowed to escape from the jacket. All that need be said with reference to the description of said arrangement at the left of the figure is that the parts numbered 44 to 58 inclusive, as set forth in the immediately preceding paragraph, are for convenience shown in duplicate at the left of the figure and numbered, respectively, 44' to 58' inclusive.

Having thus described the structure of the cooker together with the arrangement for passing a heating or cooling fluid through the jacket I shall now direct attention to the operation of the device. A sufficient amount of the material desired for treatment is put into the cooker, whereupon the latter is sealed air-tight. The cooker is then set in rotation by connecting it with a source of power through the gear-wheel 59 rigidly secured to one of the hubs. At the same time a heating fluid, such as steam, is turned into the jacket, entering hub 6 through pipe 46, and passing out of the jacket through hub 5 into the drain or return pipe 46'. The steam is also fed into the central pipe 21 from the right through suitable connections leading to the source of supply. Bearing in mind the arrangement of the stirrer-pipes 15 and the breaker-pipes 24, it will be apparent that the steam in the jacket enters the stirrer-pipes to heat the same uniformly with the entire inner surface of the cooker, and that the steam passing through the central pipe 21 enters the breaker-pipes whereby the same become heated uniformly with the stirrer-pipes and the inner surface of the cooker.

During the rotation of the cooker the material is continually rolled and tumbled about, the presence of the stirrer-pipes 15 increasing the agitation of the material. In case it is desired to positively break up large lumps, the central pipe 21 is rotated in a direction toward the observer. Such rotation may be effected by a lever of some kind clamped to the central pipe. Although I have shown the stirrer-pipes 15 in pairs, with the breaker-pipes arranged to enter the space between each pair of stirrer-pipes, any desired arrangement of the two sets of pipes may be employed. Therefore, with the breaker-pipes turned into the tumbling material, any masses or lumps too large to pass in between the movable stirrer-pipes and the stationary breaker-pipes will be crushed or broken. By this means the material is broken up into pieces more or less uniform in size. Should it be desired to subject the interior of the cooker to pressure below atmospheric, it is only necessary to open communication between pipe 27 and a vacuum pump.

Having thus briefly described one form of suitable apparatus for accomplishing the various steps of my process, I shall now proceed to set forth in detail the preferred manner of carrying my process into effect. A sufficient quantity of wet or green starch of known moisture-percentage and in clean condition is put into the cooker to fill the same from one-third to one-half. The treating-chamber is now sealed air-tight, and the rotation of the cooker begun. A steam-pressure of about 1 to 15 pounds per square inch is turned onto the jacket. At the same time the vacuum and condensing pump is started and kept at about 27 inches of mercury until enough water has been drawn off from the starch (as shown by weighing or measuring it) to bring the total moisture of the starch down to about 25%. During this treatment the starch forms into worn, pebble-like lumps of varying sizes (as fully explained in my copending application Serial No. 332,804, above mentioned); but, with the breaker-pipes turned down so as to allow the stirrer-pipes to break up any lumps that are too large to pass in between said pipes, the lumps formed are sufficiently uniform in size to harden and finish. Mixed with these pebble-like pieces will be some powder from lumps which are dried too much and thus crumble. The vacuum-pressure is now decreased slowly (as, for example, by running the pump at a lower speed); or, it may be stopped altogether. In either case the starch becomes subjected to a greater heat, its temperature soon reaching the neighborhood of 70 degrees C., or more, due to the surrounding vapor which is at about the same temperature as the starch, the latter at this point gelatinizing to a slight extent.

It is to be understood that when I mention a temperature of 70 degrees C., or thereabout, I mention it for the sake of illustration only,—that is to say, the temperature of the starch is raised to about 70° C. provided the gelatinization-point of the particular kind of starch under treatment begins at about 70° C. Some other kind of starch might have a different point of gelatinization, in which case the temperature would be regulated accordingly. The particular detail, therefore, to be borne in mind here is that the temperature of the starch should be raised only far enough to effect slight gelatinization of the starch. Manifestly, the temperature of the starch depends upon and is determined by the pressure within the cooker, whether said pressure is above or below atmospheric. This slight gelatinization causes the starch to gather up all of the loose powder, and as soon as gage-pressure has formed within the cooker all of the starch will be formed into a pebbled lump-condition. The pressure within the cooker is now slowly reduced, as by being blown off to zero, whereupon the starch-pebbles are taken out. The starch thus produced will be found to be about air-dry, and possesses the properties and characteristics of the product claimed in my co-pending application identified in the second paragraph of this specification.

Certain of the details accompanying the steps as above given might be preferably varied in instances like the following: A sufficient quantity of wet starch containing about 50% of total moisture is put into the treating-chamber to fill the same from one-third to one-half. The treating-chamber being sealed air-tight, rotation of the cooker is begun, and a vacuum of about 27 inches of mercury is created within the chamber, while at the same time a steam-pressure of about 1 to 15 pounds is fed into the jacket. It will be understood that, by thus providing within the cooker a pressure below atmospheric, I accomplish a two-fold purpose,—to wit, the rapid drying of the starch down to the desired degree of moisture, and the maintenance of the temperature of the starch below the point of gelatinization. This drying of the starch at low temperature is continued until its total moisture reaches about 27%, readily determined by measuring or weighing the water drawn off. During the drying great care should be exercised not to allow the temperature of the starch to reach the gelatinization-point in order not to cook or gelatinize it to any extent whatsoever. The cooker is now stopped and the starch taken out to be freed from all impurities (such as gluten lumps, and the like) by crushing or grinding, if necessary, and then running through a fine sieve or coarse bolting cloth. Any other customary or preferred method of taking the dirt out of the starch may be resorted to. The cleaned starch is now put back into the same machine or into another machine of the same kind,—it being understood that one or more machines may be used for the drying of the starch, while others may be used exclusively for the lumping or pebbling of the same. The cooker is then sealed and its rotation begun. At the same time a jacket steam-pressure of about 20 to 60 pounds is turned on.

During the rotation of the cooker the starch is heated, its temperature in about half an hour reaching the neighborhood of 100 degrees C. Soon thereafter steam and pressure begin to form from the moisture in the starch. Due to the surrounding steam and moisture, the starch begins to gelatinize to a slight degree. The starch-granules begin to stick together to form nuclei or centers which in rolling grow in size by the accretion of other granules and loose starch-powder. This is true also of minute starch-masses which have formed during the tumbling of the starch. In a short time, the whole starchy mass within becomes converted into innumerable sticky centers which soon gather up all the loose powder. The heating and tumbling of the starch-lumps thus formed is continued for a sufficient period during which they become worn, as well as acquire a more or less smooth and hardened periphery which prevents their powdering or crumbling. It has been found that a pressure of from 20 to 40 pounds per square inch within the cooker is about right. The operation is now brought to a completion by blowing this pressure off to zero; and, should it be found that the starch-pebbles are not about air-dry, they can readily be brought down to about 14% total moisture by reducing the pressure within the cooker below atmospheric for about fifteen minutes, during which time the starch dries rapidly, as well as cools down to a temperature at which it can be graded for packing or storage.

Of course, it is apparent that the intermediate step of cleaning in the last example cited, is not necessary when clean starch is used in the very beginning. Neither is it essential that my form of cooker be resorted to for the purpose of drying the starch: any approved style of the ordinary vacuum-drier may be used.

Having thus described my invention, what I claim as new and desire to secure by Letters Patent is:

1. The process of pebbling starch which consists in heating wet starch in a partial vacuum to dry the starch down to the desired degree of moisture, the temperature of the starch being kept below the point of gelatinization, and then heating the starch to a temperature sufficient to slightly gelatinize it and tumbling the same until substantially all of the material has formed into pebble-like lumps.

2. The process of pebbling starch which consists in heating wet starch in a partial vacuum to dry the starch down to the desired degree of moisture, the temperature of the starch being kept below the point of gelatinization, then tumbling the starch in a closed receptacle and heating the same until sufficient pressure has formed therein to effect partial gelatinization of the starch, and continuing the heating and tumbling until substantially all of the material has formed into pebble-like lumps, and then slowly reducing the pressure.

3. The process of pebbling starch which consists in heating wet starch in a partial vacuum to dry the starch down to the desired degree of moisture, the temperature of the starch being kept below the point of gelatinization, and then heating the cleaned starch in a closed receptacle to the degree necessary to slightly gelatinize it; and tumbling the same until substantially all of the material has formed into pebble-like lumps.

4. The process of pebbling starch which consists in heating wet starch in a partial vacuum to dry the starch down to the desired degree of moisture, the temperature of the starch being kept below the point of gelatinization, then cleaning the starch thus dried, and then heating the starch in a closed receptacle to the degree necessary to slightly gelatinize it, meanwhile tumbling the same, then continuing the heating and tumbling until substantially all of the material has formed into pebble-like lumps, and then slowly reducing the pressure.

5. The process of pebbling starch which consists in heating wet starch in a partial vacuum to dry the starch down to the desired degree of moisture, the temperature of the starch being kept below the point of gelatinization, then cleaning the starch thus dried, then heating and tumbling the cleaned starch in a closed receptacle until a pressure of about 20 to 40 pounds per square inch has developed therein, whereby the starch becomes slightly gelatinized, and continuing the tumbling action until substantially all of the material has formed into pebble-like lumps, and then slowly reducing the pressure.

In witness whereof, I have hereunto subscribed my name in the presence of two witnesses.

ALEXANDER P. ANDERSON.

Witnesses:
J. JAY SMITH,
LOUISE RAND BASCOM.